United States Patent
Srivastava et al.

(10) Patent No.: US 7,080,126 B2
(45) Date of Patent: *Jul. 18, 2006

(54) COMPUTER PROGRAM PRODUCT FOR PERFORMING RESOURCE POOL MAINTENANCE BY MAINTAINING RESOURCES IN SEVERAL DEQUES

(75) Inventors: Raul Srivastava, Randolph, NJ (US); Adam Messinger, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/719,088

(22) Filed: Nov. 21, 2003

(65) Prior Publication Data

US 2004/0205180 A1 Oct. 14, 2004

Related U.S. Application Data

(60) Provisional application No. 60/450,976, filed on Feb. 28, 2003.

(51) Int. Cl.
*G06F 15/173* (2006.01)
(52) U.S. Cl. ........................ 709/206; 709/223; 709/224
(58) Field of Classification Search ................ 709/102, 709/104, 223, 226, 224; 717/116; 719/316
See application file for complete search history.

(56) References Cited

U.S. PATENT DOCUMENTS

| | | | | |
|---|---|---|---|---|
| 5,991,792 A | * | 11/1999 | Nageswaran | 709/102 |
| 6,182,109 B1 | * | 1/2001 | Sharma et al. | 709/104 |
| 6,477,569 B1 | * | 11/2002 | Sayan et al. | 709/223 |
| 2003/0229888 A1 | * | 12/2003 | Spotswood et al. | 717/116 |
| 2004/0045008 A1 | * | 3/2004 | June et al. | 719/316 |
| 2004/0215777 A1 | * | 10/2004 | Piet et al. | 709/226 |

\* cited by examiner

*Primary Examiner*—Rupal Dharia
*Assistant Examiner*—Quang N. Nguyen
(74) *Attorney, Agent, or Firm*—Fliesler Meyer LLP (57) ABSTRACT

An improved resource pool is provided that provides for dynamic configuration and is comprised of code that is configured to be used for different subsystems, including JDBC, Connector, and JMS subsystems. Pool maintenance, resource object creation and timeout, multiple deque management, and pool state transition features are provided. An application server may include at least one resource pool object, wherein each resource pool object represents a resource pool in the application server. An improved prepared statement cache is also provided that works in conjunction with the resource pool implementation to more effectively provide for prepared statement processing.

20 Claims, 7 Drawing Sheets

COMPUTER PROGRAM PRODUCT FOR PERFORMING RESOURCE POOL MAINTENANCE BY MAINTAINING RESOURCES IN SEVERAL DEQUES

CLAIM TO PRIORITY

The present application claims the benefit of priority under 35 U.S.C. §119(e) to U.S. Provisional Patent Application entitled "IMPROVED CONNECTION POOL AND PREPARED STATEMENT CACHE", Application No. 60/450,976, filed on Feb. 28, 2003, which application is incorporated herein by reference

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The present application is related to the following United States Patents and Patent Applications, which patents/applications are assigned to the owner of the present invention, and which patents/applications are incorporated by reference herein in their entirety:

U.S. patent application Ser. No. 10/719,611, entitled "METHOD FOR IMPROVED CONNECTION POOL AND PREPARED STATEMENT CACHE", filed on Nov. 21, 2003, currently pending.

FIELD OF THE INVENTION

The current invention relates generally to application server management, and more particularly to application server connection pool and statement cache management and implementation.

BACKGROUND OF THE INVENTION

Application servers provide an environment for programmers to write application programs that perform services. Application servers typically include resources provided by third party vendors that can be called by application programs. Application servers may implement large numbers of the resource objects for application program use. One such application server is Web Logic Server (WLS) of BEA Systems of San Jose, Calif.

Application servers implement a resource pool to manage and track resource status. Typically, different subsystems like JDBC, Connector and JMS subsystems use separate resource pooling code implementations. Each implementation generally performs the same function for the corresponding system.

A resource adapter is a segment of code that represents an Enterprise Information System (EIS). More specifically, a resource adaptor is a system-level software driver used by an application server, such as WebLogic Server, to connect to an enterprise information system (EIS). A resource adapter serves as the "J2EE connector." The connector architecture implementation supports resource adapters developed by EIS vendors and third-party application developers that can be deployed in any application server supporting the Sun Microsystems J2EE Platform Specification, Version 1.3. Resource adapters contain the Java, and if necessary, the native components required to interact with the EIS.

SUMMARY OF THE INVENTION

In one embodiment of the present invention, an improved resource pool is provided that provides for dynamic configuration and is comprised of code that is configured to be used for different subsystems, including JDBC, Connector, and JMS subsystems. Pool maintenance, resource object creation and timeout, multiple deque management, and pool state transition features are provided. An application server may include at least one resource pool object, wherein each resource pool object represents a resource pool in the application server. An improved prepared statement cache is also provided that works in conjunction with the resource pool implementation to more effectively provide for prepared statement processing.

DETAILED DESCRIPTION

In one embodiment of the present invention, an improved resource pool is provided that provides for dynamic configuration and is comprised of code that is configured to be used for different subsystems, including JDBC, Connector, and JMS subsystems. Pool maintenance, resource object creation and timeout, multiple deque management, and pool state transition features are provided. An application server may include at least one resource pool object, wherein each resource pool object represents a resource pool in the application server. An improved prepared statement cache is also provided that works in conjunction with the resource pool implementation to more effectively provide for prepared statement processing.

Previously, JDBC and Connector subsystems within typical application servers have their own connection pool implementations. In one embodiment of the present invention, the JDBC, Connector, and JMS subsystems share common resource pool functions. Other subsystems may use the common resource pool functions as well. These three and other subsystems reuse code that implements common resource pooling functionality.

Resource pools may be implemented with a resource pool object. In one embodiment, resource pools consist of three deques called "RESERVED", "AVAILABLE", and "UNAVAILABLE". The deques may be implemented using proprietary (NOT java.util.LinkedList) doubly-linked lists. The three deques will respectively contain instances of resources that are currently reserved by, available or unavailable to be reserved by callers such as application programs. RESERVED contains resource instances that have been requested or are in use. AVAILABLE contains resource instances currently available in the resource pool. UNAVAILABLE will contain resource instances that were previously not created successfully or able to be refreshed, typically because the backend system (e.g., Database) is currently unavailable.

Figure 1:
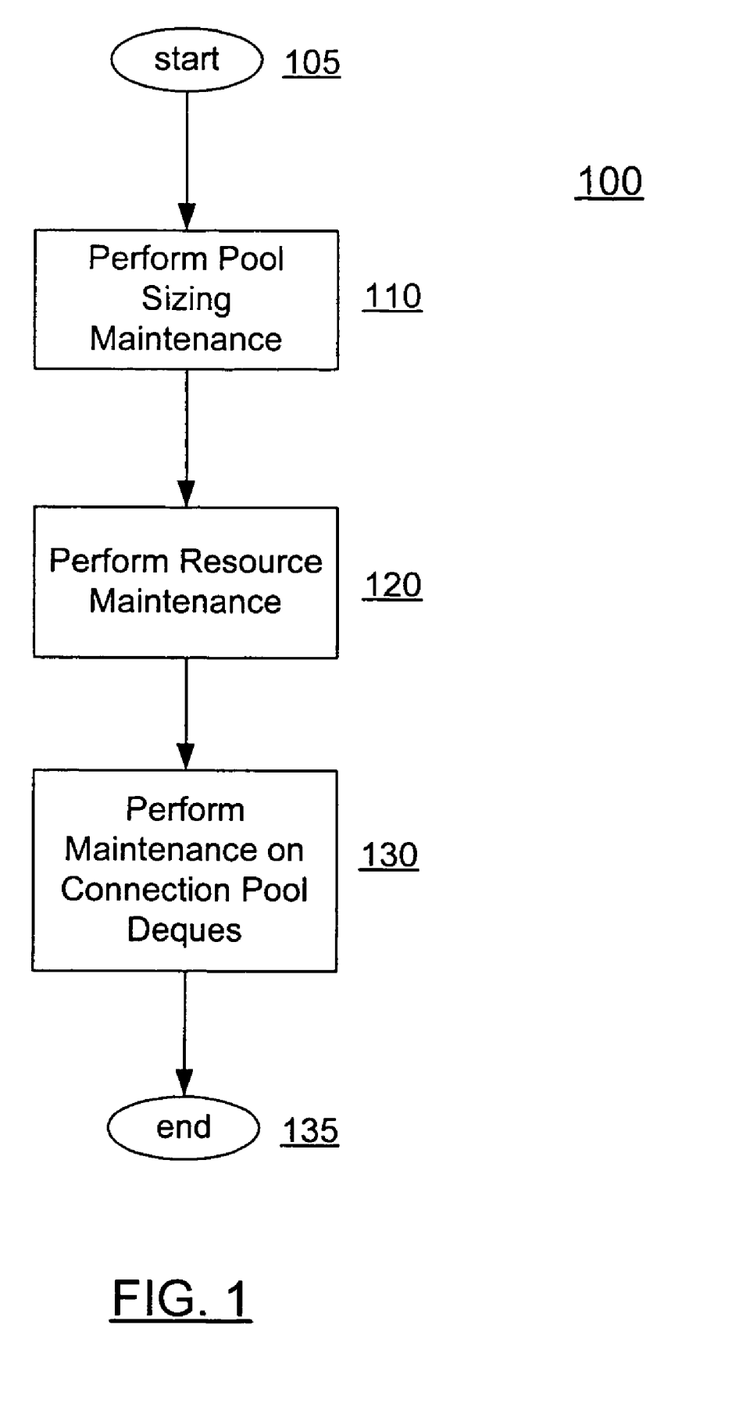
FIG. 1 is an illustration of a method for performing connection pool maintenance in accordance with one embodiment of the present invention.

FIG. 1 illustrates a method 100 for performing connection pool maintenance in accordance with one embodiment of the present invention. In one embodiment, method 100 is performed every time a resource pool object task is executed for a resource pool. Method 100 begins with start step 105. Next, any pool sizing maintenance is performed at step 110. Resource maintenance is then performed at step 120. Maintenance is then performed on Connection Pool deques at step 130. Operation of method 100 then terminates at step 135. For each of steps 110 through 130, the application server system may determine whether or not any action is actually performed. Thus, each of steps 110 through 130 is optional, and may be performed in a different order or not at all. In one embodiment, method 100 is carried out by a pool maintenance task that is created internally by the resource pool object and configured to run periodically. Steps 110, 120 and 130 are discussed in more detail in the methods illustrated in FIGS. 2, 3 and 4, respectively.

Figure 2:
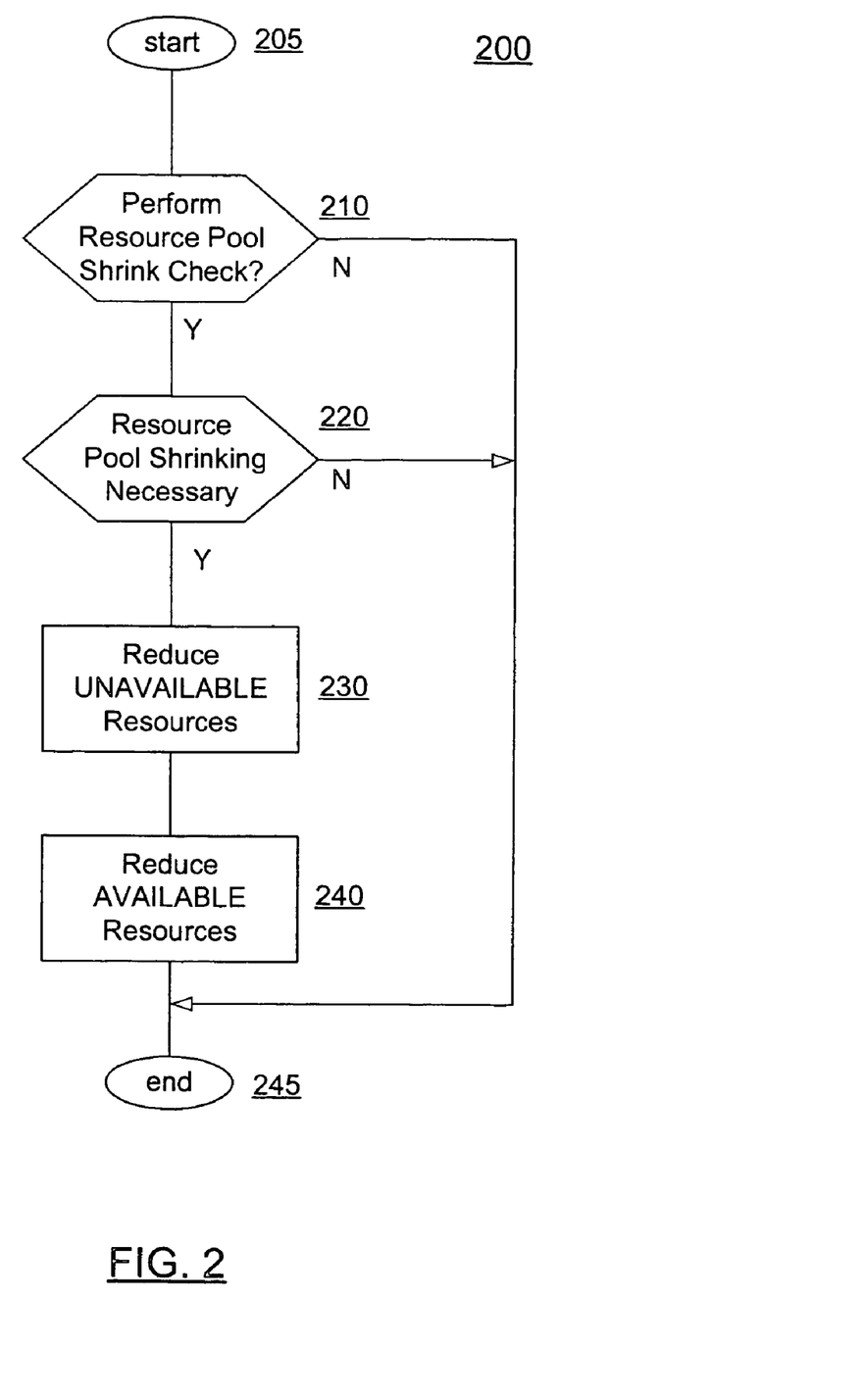
FIG. 2 is an illustration of a method for performing pool size maintenance in accordance with one embodiment of the present invention.

FIG. 2 illustrates a method 200 for performing pool size maintenance in accordance with one embodiment of the present invention. Method 200 begins with start step 205. Next, the resource pool object determines whether or not to perform a resource pool shrink check at step 210. Thus, the resource pool object determines whether or not it should inquire if pool shrinking may be necessary. In one embodiment, the resource pool object may implement pool shrinking periodically. In this case, an attribute may be set that determines the frequency of pool shrinking. The shrinking frequency attribute may be set by an application program or by the resource pool object. In one embodiment, the attribute is called "ShrinkFrequencySeconds". If the resource pool object is to check for required pool shrinking, operation continues to step 220. If a pool shrink check is not required, operation continues to step 245.

The resource pool object determines if pool shrinking is necessary at step 220. In one embodiment, pool shrinking is necessary if any resources are contained within the AVAILABLE AND UNAVAILABLE deque. In one embodiment, pool shrinking may be necessary if the number of resources currently in the pool exceeds the number of total resources allowed in a pool, or if the number of unavailable resources in a pool exceeds the number of unavailable resources allowed in a pool. Both the maximum resources allowed and maximum unavailable resources allowed may be set using a resource pool parameter. If pool shrinking is to be performed, operation continues to step 230. If no pool shrinking is to be performed, operation continues to step 245. At step 230, resources in the UNAVAILABLE deque are reduced. In one embodiment, the number of resources in the UNAVAILABLE deque is reduced to the coincide with the value of a highest number of UNAVAILABLE resources parameter. In one embodiment, the resource pool object destroys resources in the UNAVAILABLE deque. Next, resources in the AVAILABLE deque are reduced. In one embodiment, the number of resources in the AVAILABLE deque is reduced such that the total resources in the pool coincides with the value of a maximum number of resources parameter. In one embodiment, the resource pool object destroys resources in the AVAILABLE deque. Operation of method 200 then terminates at step 245.

Figure 3:
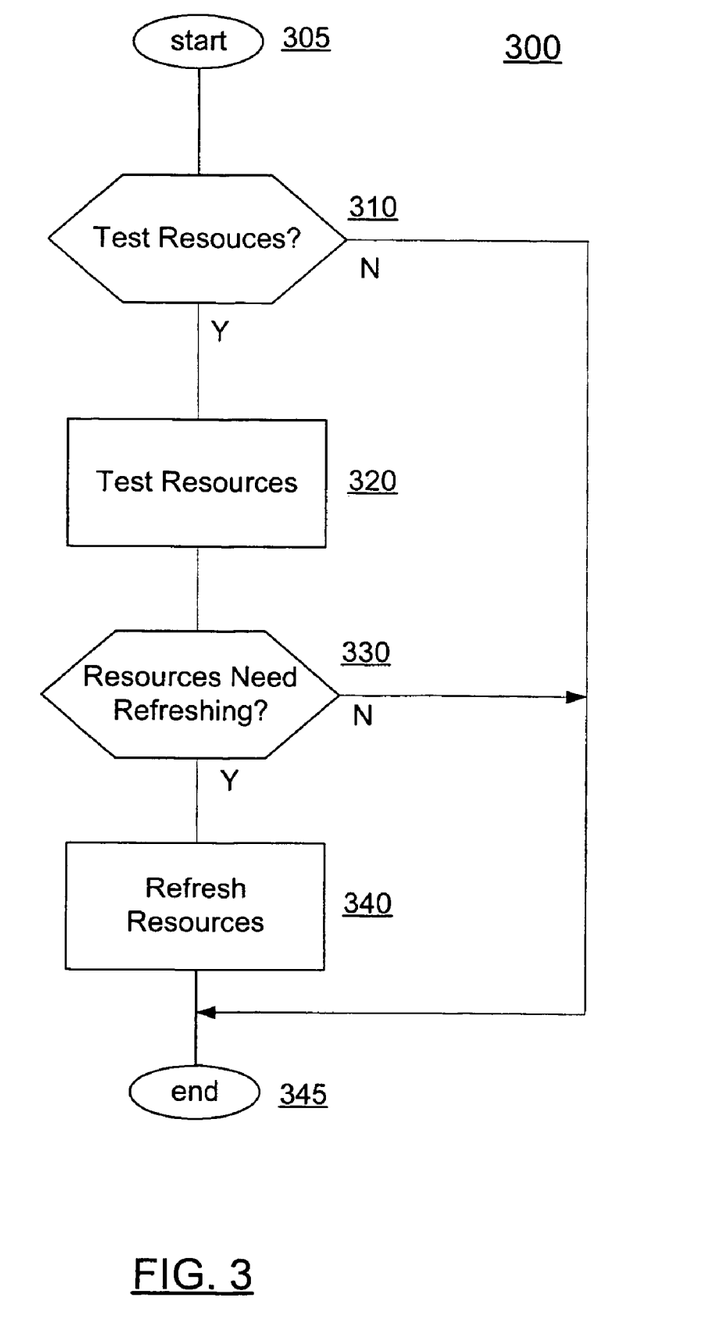
FIG. 3 is an illustration of a method for performing resource maintenance in accordance with one embodiment of the present invention.

FIG. 3 illustrates a method 300 for performing resource maintenance in accordance with one embodiment of the present invention. Method 300 begins with start step 305. Next, the resource pool object determines whether or not to test resources at step 310. In one embodiment, the resource pool object may test resources periodically. In this case, an attribute may be set that determines the frequency of resource testing. The resource testing attribute may be set by an application program or by the resource pool object. In one embodiment, the attribute is called "TestFrequencySeconds". If the resource pool object is to perform test resources, operation continues to step 320. If a resource test is not required, operation continues to step 345.

Resources are tested at step 320. In one embodiment, the resource test determines if the resource is functioning properly. If at step 330 any resources are determined to need refreshing, operation of method 300 continues to step 340. Resources may be determined to require refreshing based on the results of the resource test. If no resources need refreshing, operation continues to step 345. At step 340, resources are refreshed. Operation of method 300 then ends at step 345.

Figure 4:
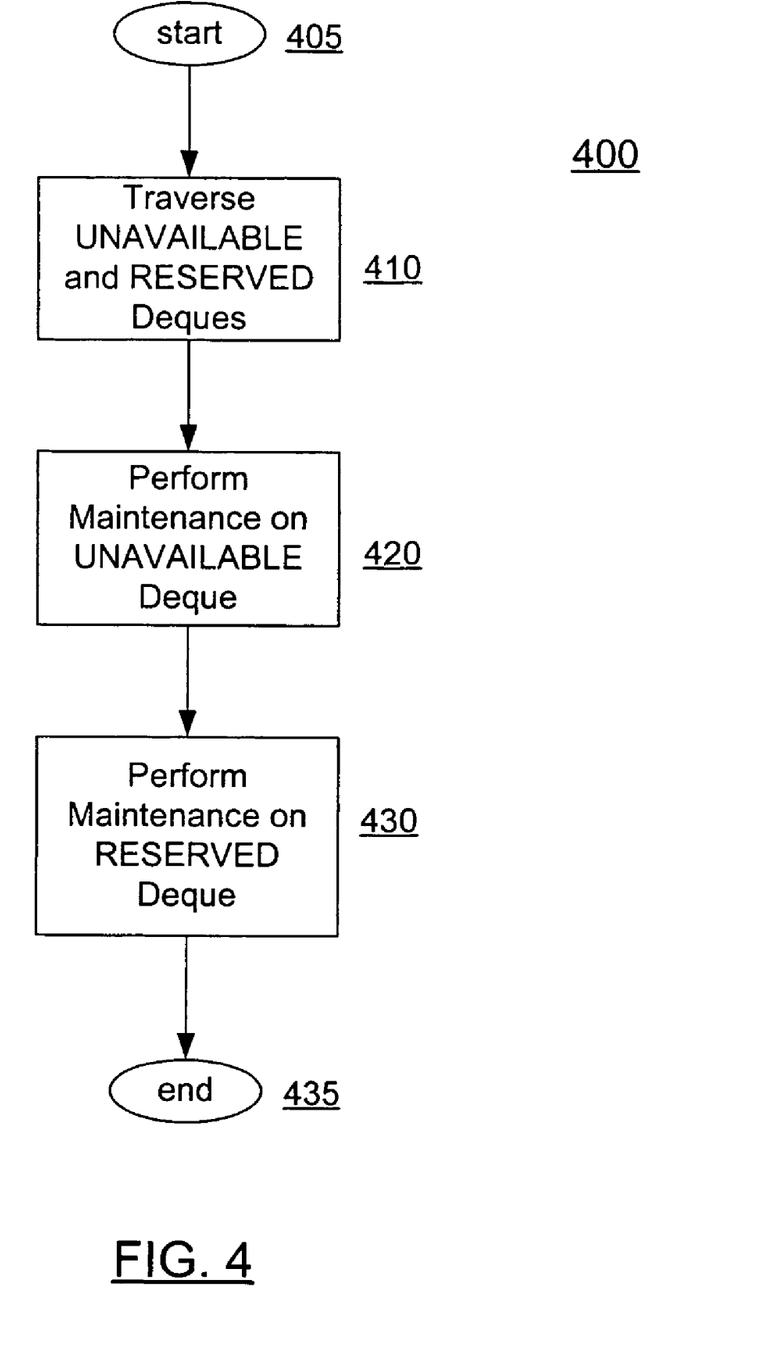
FIG. 4 is an illustration of a method for performing maintenance on connection pool deques in accordance with one embodiment of the present invention.

FIG. 4 illustrates a method 400 for performing maintenance on connection pool deques in accordance with one embodiment of the present invention. Method 400 begins with start step 405. The UNAVAILABLE and RESERVED deques are traversed by the resource pool object at step 410. In one embodiment, traversing the UNAVAILABLE and RESERVED deques includes determining what resources are in each deque, if any. Maintenance is then performed on the UNAVAILABLE deque at step 420. In one embodiment, the maintenance in step 420 includes scheduling resource creation for each resource in the UNAVAILABLE deque. Scheduled resource creation is discussed in more detail with reference to FIG. 5. Maintenance is then performed on the RESERVED deque at step 420. In one embodiment, the maintenance in step 420 includes scheduling maintenance for each resource in the RESERVED deque. Scheduled RESERVED maintenance is discussed in more detail with reference to FIG. 6. Operation of method 400 then ends at step 435.

Figure 5:
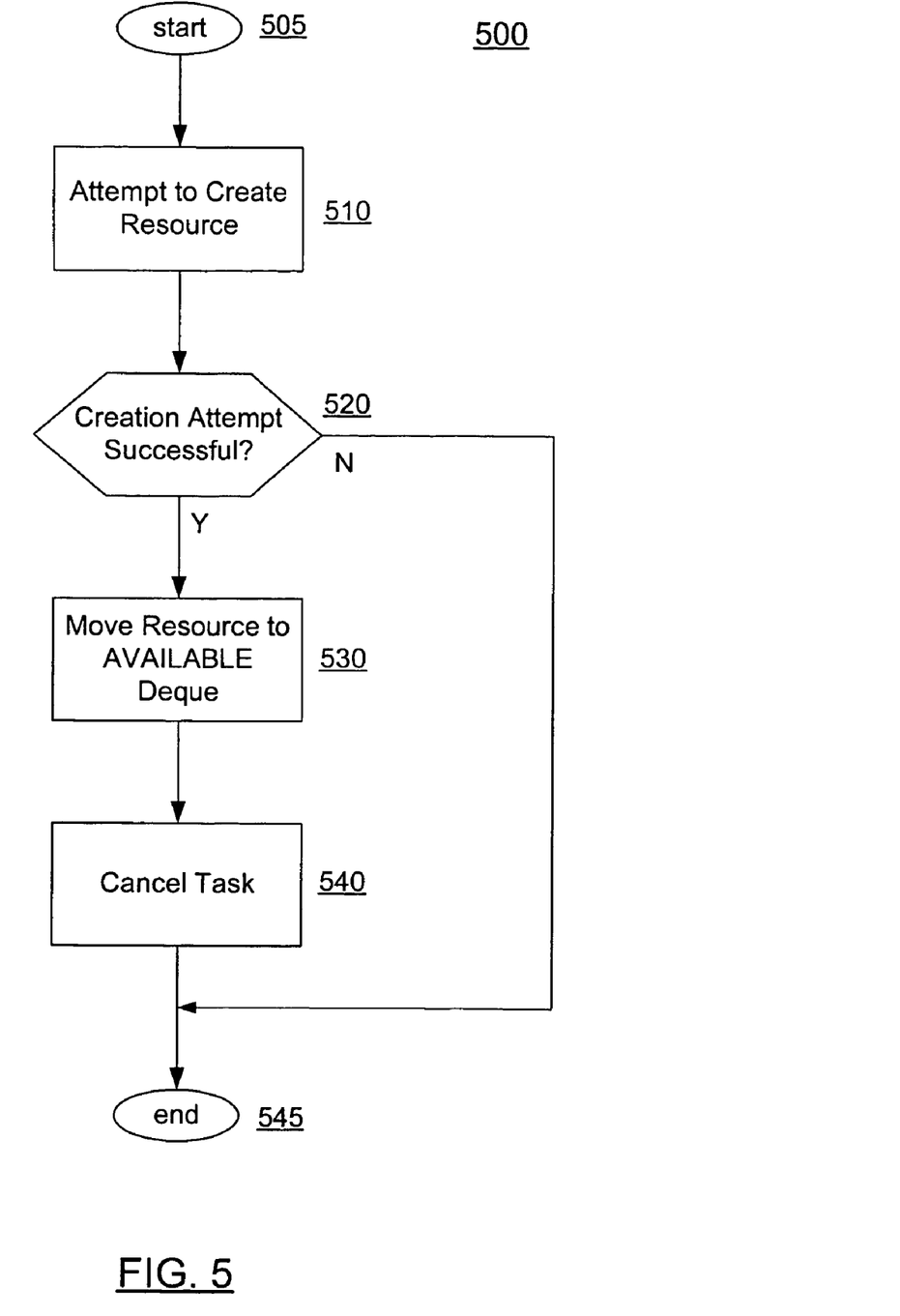
FIG. 5 is an illustration of a method for performing resource creation in accordance with one embodiment of the present invention.

FIG. 5 illustrates a method 500 for performing resource creation in accordance with one embodiment of the present invention. Method 500 may be performed by a resource creation retry task. In one embodiment, a resource is added to the UNAVAILABLE deque by the resource pool object if the resource cannot be created or refreshed. The next time method 100 executes and finds this resource on the UNAVAILABLE deque, the resource pool object will schedule the resource creation retry task on the resource.

Operation of method 500 begins with start step 505. Next, the resource pool object attempts to create the resource at step 510. If the resource pool object determines at step 520 that the creation attempt was successful, operation continues to step 530. If the creation attempt is determined to have failed, operation continues to step 545. At step 530, the created resource is moved to the AVAILABLE deque. The resource pool object is thus made available to an application. Next, the resource creation retry task on the resource is cancelled at step 540. Operation of method 500 then ends at step 545. In one embodiment, the periodicity of the resource creation retry attempts can be configured by either an application or the resource pool object. In an embodiment, an attribute "ResourceCreationRetrySeconds" may be set to determine the periodicity of the of the resource creation retry attempts.

Figure 6:
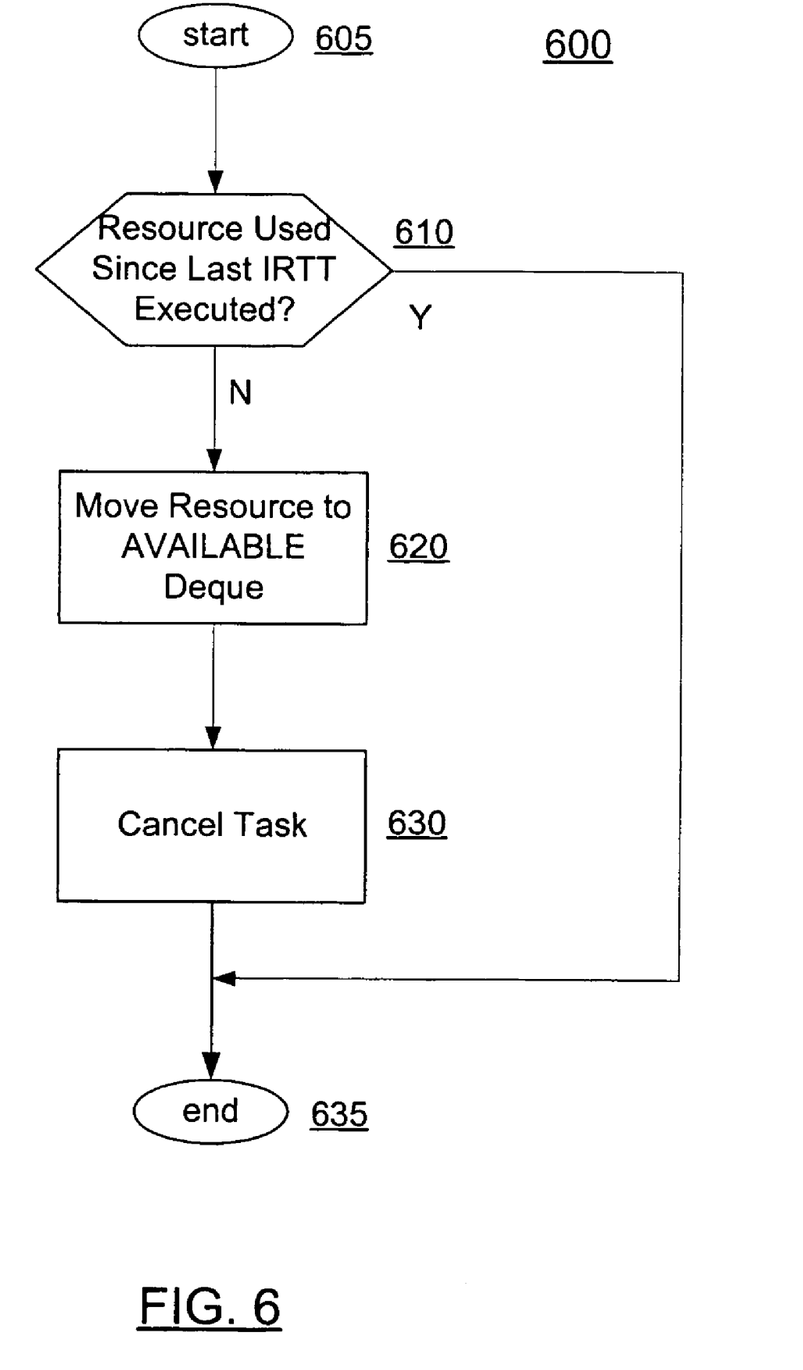
FIG. 6 is an illustration of a method for performing maintenance on reserved resources in accordance with one embodiment of the present invention.

FIG. 6 illustrates a method 600 for performing maintenance on reserved resources in accordance with one embodiment of the present invention. Method 600 may be performed by an inactive resource timeout task. In one embodiment, a resource is added to the RESERVED deque when it is called by an application program. The next time method 100 is performed, such as during execution of the pool maintenance task, and the resource is found on the RESERVED deque, the resource pool object may schedule an inactive resource timeout task on the resource.

Operation of method 600 begins with start step 605. At step 610, a check is made to determine whether a particular resource has been used since the last execution of method 600. In one embodiment, the check includes determining whether or not the resource has been used since the last execution of the inactive resource timeout task. If the resource was not used, operation continues to step 620. If the resource was used since the last timeout check, operation continues to step 635. At step 620, the resource is moved to the AVAILABLE deque. In this case, the resource is released back into the resource pool and made available to application programs. The inactive resource timeout task on the particular resource is then cancelled at step 630. Operation of method 600 then terminates at step 635. In one embodiment, the periodicity of the resource timeout check can be configured by either an application or the resource pool object. In an embodiment, an attribute "InactiveResourceTimeoutSeconds" may be set to determine the periodicity of the of the resource timeout checks.

Figure 7:
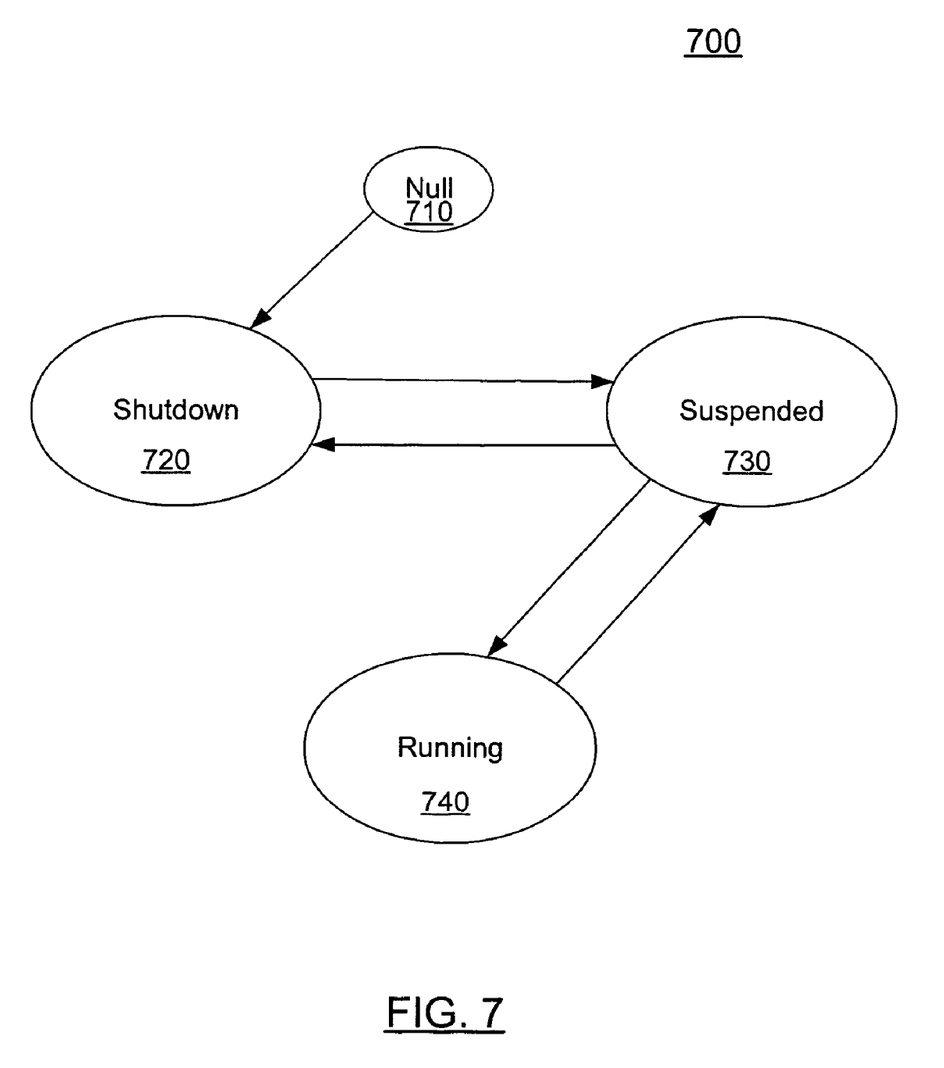
FIG. 7 is an illustration of system of state transitions for a resource pool in accordance with one embodiment of the present invention.

In embodiments discussed above, the methods of FIGS. 1, 5 and 6 may be carried out by tasks. In this embodiment, the pool maintenance task associated with method 100 may create the resource creation retry task associated with method 500 and the inactive resource timeout task associated with method 600. A resource creation retry task may be created on a resource only after the resource is moved into the UNAVAILABLE deques. An inactive resource timeout task may be created on a resource only after the resource is moved into the RESERVED deques. The resource creation retry task and the inactive resource timeout task are each cancelled when the corresponding resource is moved off the UNAVAILABLE or RESERVED deques. In one embodiment, no individual task is scheduled on resources sitting on the AVAILABLE deque. Resource pools may be in one of several operational states. In one embodiment, the resource pool states may include "SHUTDOWN", "SUSPENDED" and "RUNNING". FIG. 7 illustrates a system 700 of state transitions for a resource pool in accordance with one embodiment of the present invention. System 700 includes a null state 710, a shutdown state 720, a suspended state 730, and a running state 740. State transitions are allowed as indicated by the directional arrows in system 700. In particular, when a resource pool (RP) object is created, the RP state transitions from null to SHUTDOWN. When a RP is started, the RP state transitions from SHUTDOWN to SUSPENDED. When a suspended RP is resumed, the RP state transitions from SUSPENDED to RUNNING. When a RP is suspend, the RP state transitions from RUNNING to SUS- PENDED. When an RP is forcefully Suspended, the RP state transitions from RUNNING to SUSPENDED. When an RP is shutdown, the RP state transitions from SUSPENDED to SHUTDOWN. If a valid state transition is attempted multiple times, all but the first attempt are deemed non-operation. In one embodiment, a resource in a pool can only be reserved when the resource pool is in the RUNNING state. When the pool is in the SHUTDOWN state, release, shrink and reset operations can not be performed.

In one embodiment, a resource pool may be implemented as a Java instance of a class. The class may extend the abstract class weblogic.common.resourcepool.ResourcePoolImpl in WLS (which implements the interface weblogic.common.resourcepool.ResourcePool). The interface weblogic.common.resourcepool.ResourcePool is shown below. The only method that will be declared abstract in this class will be "initPooledResourceFactory( )". Every other method in ResourcePool will be implemented in the base implementation ResourcePoolImpl (but can be overridden in the subclasses). In one embodiment of the JDBC subsystem, the WLS class weblogicjdbc.common.internal.ConnectionPool extends the class ResourcePoolImpl.

```
import java.util.Properties;
// pool of PooledResource objects
public interface ResourcePool extends ObjectLifeCycle {
// pool management API
/**
 * initialize and return factory to create resource instances
 * @param poolInfo Properties object containing pool configuration
     attributes
(this object is initially passed to the generic resource pool object
constructor when the subsystem is instantiating the pool).
*/
private PooledResourceFactory initPooledResourceFactory(Properties
poolInfo) throws ResourceException;
/**
 * shrink the pool
 * Shrinks the pool to the max of the currently reserved #
resources or the initial size
 */
  public void shrink( ) throws ResourceException;
  /**
   * refreshes all the resource instances in the pool.
   */
  public void refresh( ) throws ResourceException;
/**
 * @return PoolState object containing the current state of the
pool. Can be one of the following:
 *    SHUTDOWN: initial (default) state
 *    SUSPENDED: pool is disabled
 *    RUNNING: pool is enabled
 */
public PoolState getState( );
// return all the resources in the pool
  public PooledResourceWrapper[] getResources( );
// pool access API
/**
 * reserve a resource in the pool
 * @param waitSeconds
 *    0 : wait for ever (blocking)
 *    >0 : wait for specified # seconds (blocking with timeout)
 *    -1 : don't wait (non-blocking)
 * @param info if not null, selected resource must match this criterion
 */
  public PooledResource reserveResource(int waitSeconds,
PooledResourceInfo info)
    throws ResourceException;
  /**
   * reserve a resource in the pool. wait as long as specified in
   * "ReservedTimeoutSeconds" MBean attribute.
   * @param info if not null, selected resource must match this criterion
   */
```

-continued

```
public PooledResource reserveResource(PooledResourceInfo info)
    throws ResourceException;
/**
 * release the resource back to the pool
 * @param resource to be released
 */
public void releaseResource(PooledResource resource)
    throws ResourceException;
/**
 * create specified # instances of resources, upto the allowed
 * maximum capacity of the pool. associate a PooledResourceInfo
    object
 * from the array 'infoList' with each of the new resource instance.
 */
public void createResources(int count, PooledResourceInfo[] infoList)
    throws ResourceException;
/**
 * select a resource from the pool that matches the specified
 * PooledResourceInfo. returns 'null' if none found.
 * @param info if not null, selected resource must match this criterion
 */
public PooledResourceWrapper matchResource(PooledResourceInfo
    info)
        throws ResourceException;
// pool statistics API
// returns leaked resources (reserved from the pool but not returned)
public int getNumLeaked( );
// increment # leaked resources (reserved from the pool but not returned)
public int incrementNumLeaked( );
// returns count of # failed attempts to refresh resources
public int getNumFailuresToRefresh ( );
// returns averaged time (in milliseconds) to create a resource instance.
public int getCreationDelayTime( );
// returns # waiters for resources
public int getNumWaiters( );
// returns high water mark of # waiters for resources
public int getHighestNumWaiters( );
// returns the longest # seconds a waiter waited for a resource
public int getHighestWaitSeconds( );
// returns total # resources allocated in the pool since its creation
public int getTotalNumAllocated( );
public int getTotalNumDestroyed( );
public int getNumReserved( );
public int getNumAvailable( );
public int getNumUnavailable( );
public int getHighestNumReserved( );
public int getHighestNumUnavailable( );
public int getHighestNumAvailable( );
public int getAverageReserved( );
public int getResourceLeakProfileCount( );
public ResourceLeakProfile getResourceLeakProfiles(index,count);
// dynamically tunable attributes
public void setMaximumCapacity(int);
public void setInitialCapacity(int);
public void setCapacityIncrement(int);
public void setShrinkEnabled(boolean);
public void setShrinkFrequencySeconds(int);
public void setInactiveResourceTimeoutSeconds(int);
public void setResourceCreationRetrySeconds(int);
public void setHighestNumWaiters(int);
public void setHighestNumUnavailable(int);
public void setResourceReserveTimeoutSeconds(int);
}
```

In one embodiment, resource pool objects may invoke the different methods of pooled resource objects during the lifetime of the pool. Some of these methods in accordance with this embodiment of the present invention are shown below.

```
/* methods defined in weblogic.common.resourcepool.ObjectLifeCycle */
// create 'initialCapacity' instances of PooledResource
start( )
```

-continued

```
    call makeResources(initialCapacity)
// enable pool and all resources within it
resume( )
    call PR.enable( ) on all PRs in the pool
// disable pool and all resources within it.
suspend( )
    call PR.disable( ) on all PRs in the pool
// disable pool and all resources within it. destroys and recreates resource
instances currently reserved by users.
forceSuspend( )
    call PR.disable( ) on all PRs in the pool
    replaceResources(resvCount)
// destroy all pooled resource instances in the pool
shutdown( )
    calls PR.destroy( ) on all PRs in the pool
/* methods defined in weblogic.common.resourcepool.ResourcePool */
// reserve a resource from the pool
reserveResource( )
    if "testOnReserve" is enabled
        calls PR.test( ) to test resource
        if test fails, call PRF.refreshResource( )
// release a resource back into the pool
releaseResource( )
    call PR.cleanup( )
    if "testOnRelease" is enabled
        calls PR.test( ) to test resource
        if test fails, call PRF.refreshResource( )
// refresh all resources in the pool
refresh( )
    call PRF.refreshResource( ) for all PRs in the pool
// shrink the pool to greater of current usage and initial capacity
shrink( )
    call PR.destroy( ) on all the PRs selected to destroy
// private utility methods
makeResources(count)
    do the following 'count' number of times
        call PRF.createResource( ) to create resource
        call PR.initialize( ) to initialize the created resource
        call PR.getCreationTime( ) to collect statistics
        if 'testOnCreate' is enabled
            call PR.test( )
            if test fails, call PRF.refreshResource( )
replaceResources(count)
    do the following 'count' number of times
        call PR.destroy( )
makeResources(count)
```

As discussed above, a resource pool object may be configured with parameters that define and control the resource pool. These attributes-may be added to the respective external representations across the subsystems. Examples of these parameters are discussed briefly. The CapacityIncrement parameter specifies the increment by which the pool size is increased. In one embodiment, the maximum value is java.lang.Integer.MAX_VALUE, minimum is 1 and default is 1.

The HighestNumWaiters parameter specifies the maximum number of waiters that can concurrently block waiting to reserve a resource from the pool. For example, the number of waiters may be the number of threads trying to access connection objects. In this case, the parameter specifies that there is a maximum number of threads that can wait for connection objects. The remainder of the threads will not by allowed to wait. Typically, they will perform re-try attempts. In one embodiment, the maximum value is java.lang.Integer.MAX_VALUE, minimum is 0 and default is 0 (feature disabled).

The HighestNumUnavailable parameter specifies the maximum number of resource instances in the pool that can be made unavailable (to the application) for purposes like refreshing the resource. Note that in cases likes the backend system being unavailable, this specified value could be exceeded due to factors outside the pool's control. In one embodiment, the maximum value is java.lang.Integer. MAX_ VALUE, minimum is 0 and default is 0 (feature disabled). The InitialCapacity specifies the number of resource instances contained in the pool when it is first created. In one embodiment, the maximum value is java.lang.Integer.MAX_ VALUE, minimum is 0 and default is 1. The InactiveResourceTimeoutSeconds parameter specifies the number of seconds of inactivity after which a reserved resource will automatically be reclaimed back by the pool. In one embodiment, the maximum value is java.lang.Integer.MAX_ VALUE, minimum is 0 and default is 0 (feature disabled). The ShrinkEnabled parameter is a Boolean flag to enable the shrink feature. In one embodiment, the default is true. The MaximumCapacity parameter specifies the maximum number of resource instances contained in the pool. In one embodiment, the maximum value is java.lang.Integer. MAX_ VALUE, minimum is 1 and default is 1. The Name parameter specifies the name of the pool.

The ResourceCreationRetryFrequencySeconds parameter specifies the periodicity of retry attempts by the pool to establish resource instances. Unlike previous connection pools, if a requested resource, such as a database, is down, the resource pool will still be created. The created pool will attempt to retry connections with the down resource periodically as configured. In one embodiment, the maximum value is java.lang.Integer.MAX_VALUE, minimum is 0 and default is 0 (feature disabled). The ResourceReserveTimeoutSeconds parameter specifies the number of seconds after which the call to reserve a resource from the pool will timeout. Thus, this parameter allows a limit to be placed on the time waiting for a requested resource. In one embodiment, the maximum value is java.lang.Integer.MAX_ VALUE, minimum is −1 and default is −1 (don't block when reserving resources).

The ShrinkFrequencySeconds parameter specifies the periodicity at which the pool is shrunk. In one embodiment, the maximum value is java.lang.Integer.MAX_VALUE, minimum is 0 and default is 0 (attribute disabled to interoperate with deprecated attributes like 'ShrinkPeriodMinutes' for JDBC, etc.). The TestFrequencySeconds parameter specifies the periodicity at which resource instances in the pool are tested. In one embodiment, the maximum value is java.lang.Integer.MAX_VALUE, minimum is 0 and default is 0 (attribute disabled to interoperate with deprecated attributes like 'RefreshMinutes' for JDBC, etc.). The TestOnCreate parameter is a Boolean flag to enable testing of newly created resource instances. In one embodiment, the default is false. The TestOnRelease parameter is a Boolean flag to enable testing of resource instances when they are being released back into the pool. In one embodiment, the default is false. The TestOnReserve parameter is a Boolean flag to enable testing of resource instances when they are being reserved. In one embodiment, the default is false.

A SecurityContext parameter may specify the minimum acceptable security context for a connection. This parameter specifies the security context that an application program is looking for in a resource. In one embodiment, the security context feature is an extension of the resource matching feature in WLS, which associates a context which each source. In the resource matching feature, and example of a resource context that a resource may require is javax.resource.spi.connetionrequestinfo.

Some of the parameters discussed above may be dynamically configurable. In one embodiment, the dynamically configurable resources include MaximumCapacity, InitialCapacity, CapacityIncrement, ShrinkEnabled, TestOnReserve, TestOnRelease, TestOnCreate, ShrinkFrequencySeconds, InactiveResourceTimeoutSeconds, ResourceCreationRetrySeconds, HighestNumWaiters, HighestNumUnavailable, and ResourceReserveTimeoutSeconds.

Resource pools maintain a pool of pooled resource objects for use by application programs. In one embodiment, they implement the WLS interface weblogic.common.resourcepool. PooledResource. The WLS interface weblogic.common.resourcepool.PooledResource is illustrated below. In one embodiment in the JDBC subsystem, the class weblogicjdbc.common.internal.ConnectionPoolEnv implements the interface PooledResource. The resource pooled object invokes the "createResourceo" methods of PRF objects to create new resource instances and "refreshResource(PooledResource)" to refresh the specified resource.

```
// objects that need to be pooled in ResourcePools must implement this
interface.
public interface PooledResource {
// Lifecycle API
/**
 * one time initialization of the object. typically used if creation
 * and initialization of the object are separate operations (hence
 * constructor can't do initialization also).
 */
public void initialize( );
// enable object for use by consumers.
public void enable( );
// disable object so that it can't be used by consumers.
public void disable( );
// when a resource is being released back into the pool, this is called to
clean the resource
//before it is added back into the pool.
public void cleanup( ) throws ResourceException;
// destructor (typically, the inverse of the constructor and/or
'initialize').
public void destroy( );
// Management API
/**
 * test the resource
 * @returns
 *    0: test wasn't run (presume success)
 *    1: test was successful
 *   −1: test failed
 */
public int test( ) throws ResourceException;
// returns time taken (in milliseconds) to create the resource
public int getCreationTime( ) throws ResourceException;
// mark the resource as having being used.
public void setUsedFlag(boolean newValue);
// return whether the resource has been used or not.
public boolean getUsedFlag( );
}
```

A subsystem that wants to pool resources in a resource pooled object may provide a factory that creates the pooled resource object to be pooled. In one embodiment, the factory object will implement the WLS interface weblogic.common.resourcepool. PooledResourceFactory. The interface weblogic.common.resourcepool.PooledResourceFactory is shown below. In one embodiment of the JDBC subsystem, the class weblogic. jdbc.common.internal. ConnectionPoolEnvFactory implements the interface PooledResourceFactory.

```
// Used to create instances of PooledResource objects.
public interface PooledResourceFactory {
/**
 * Creates a new instance of a resource when invoked by a
    resource pool.
```

```
-continued

* @return New instance of the resource created
 */
public PooledResource createResource( ) throws ResourceException;
/**
 * Refreshes specified instance of resource.
 * for resources that are wrappers around connections to backend
systems, this method will typically close and re-establish the physical
connection to the backend, while preserving the remaining state of the
wrapper object.
 * for other resources, this method will typically call PR.destroy( ) on the
existing resource and then call createResource( ).
 */
public void refreshResource(PooledResource) throws ResourceException;
}
```

In one embodiment of the present invention, an improved prepared statement cache is provided. The prepared statement cache provides for generated prepared statements to be cached such that they can by used by other requesting entities without having to generate the prepared statement another time. The new implementation will enable applications to control and dynamically configure the number of prepared statements that are cached, select an algorithm from a predefined list that controls the behavior of the cache, dynamically enable, disable and clear the cache, and make use of the caching of prepared statements being done at the driver level (when using JDBC 3.0 compliant drivers). The new functionality and control may be exposed via new methods on the JDBCConnectionPoolMBean and JDBCConnectionPoolRuntimeMBean.

Several algorithms may be used to implement the prepared statement cache. In one algorithm, the prepared statements not used within a certain period may be removed from the cache. In another algorithm, once a certain number (that is less than the number of total prepared statements allowed) of prepared statements has been cached, for each added statement or number of statements added, the same number of statements is removed. The removed statements may be either the least used statements in a certain time period or for the duration of the cache. These algorithms are for illustration purposes, and other prepared statement caching algorithms are considered within the scope of the present invention. Alternatively, a non-algorithm caching method may be implemented wherein a set number of specific prepared statements are contained in the cache. The statement cache can also be cleared by an application program. Alternatively, selected prepared statements may be cleared from the cache.

In one embodiment, the prepared statement cache may have a number of attributes to configure its operation. A StatementCacheSize attribute specifies the maximum size of the cache. Maximum allowed value for this attribute is 300, minimum is 0 and default is 0 (feature disabled). This attribute is dynamically configurable. A StatementCacheAlgorithm attribute specifies the algorithm to use to determine which statement in the cache should be closed and removed from the cache to make space for the new statement to be cached. A StatementCacheEnabled attribute indicates whether the application program requests to use the cache or not. Allowed values are "true" and "false" and default is "false" (feature disabled). This attribute is dynamically configurable.

Methods will be added to the JDBCConnectionPoolMBean to access or modify the above attributes:

```
get StatementCacheSize( );
void setStatementCacheSize(int newVal);
String getStatementCacheAlgorithm( );
boolean getStatementCacheEnabled( ); and
void setStatementCacheEnabled(boolean newVal).
```

A method added to the JDBCConnectionPoolRuntimeMBean to enable applications to clear the cache is: void clearStatementCache( ).

In one embodiment of the present invention, an improved resource pool is provided that provides for dynamic configuration and is comprised of code that is configured to be used for different subsystems, including JDBC, Connector, and JMS subsystems. Pool maintenance, resource object creation and timeout, multiple deque management, and pool state transition features are provided. An application server may include at least one resource pool object, wherein each resource pool object represents a resource pool in the application server. An improved prepared statement cache is also provided that works in conjunction with the resource pool implementation to more effectively provide for prepared statement processing.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, configuring and implementing resource pool objects, pooled resource objects, and prepared statement caches.

The invention claimed is:

1. A computer program product, embedded in a computer readable storage medium, for execution by a server computer for performing resource pool size maintenance for an application server, comprising:
   computer code for maintaining a pool of resources for the application server;
   computer code for maintaining a first plurality of resources that have been determined to be at least one of not created successfully and not able to be refreshed, in an unavailable deque of the resource pool;
   computer code for maintaining of a second plurality of resources that have been determined to be available, in an available deque of the resource pool;
   computer code for triggering a resource pool shrink check;
   computer code for determining that pool shrinking is necessary;
   computer code for reducing resources in the unavailable deque of the resource pool; and
   computer code for subsequently reducing resources in the available deque of the resource pool.

2. The computer program product of claim 1 wherein said computer code for triggering a resource pool shrink check includes:
   computer code for determining that a period of time has expired; and
   computer code for performing the resource pool shrink check at the expiration of the period of time.

3. The computer program product of claim 2 wherein the period of time is set by a programmable attribute.

4. The computer program product of claim 1 wherein said computer code for determining that pool shrinking is necessary includes:
   computer code for detecting resources contained in the available deque or the unavailable deque.

5. The computer program product of claim 1 wherein said computer code for determining that pool shrinking is necessary includes:
   computer code for determining that the number of resources in the resource pool is greater than a maximum resource pool threshold value.

6. The computer program product of claim 5 wherein the maximum resource pool threshold value is set by a programmable attribute.

7. The computer program product of claim 1 wherein said computer code for reducing resources in the unavailable deque includes:
   computer code for reducing resources in the unavailable deque to coincide with a maximum unavailable resources threshold value.

8. The computer program product of claim 1 wherein said computer code for reducing resources in the unavailable deque includes computer code for destroying the resources.

9. The computer program product of claim 1 wherein said computer code for reducing resources in the available deque includes:
   computer code for reducing resources in the available deque to coincide with a maximum resource pool threshold value.

10. The computer program product of claim 1 wherein said computer code for reducing resources in the available deque includes computer code for destroying the resources.

11. A computer program product, embedded in a computer readable storage medium, executable by a server computer for performing resource pool maintenance, comprising:
   computer code for maintaining a pool of resources;
   computer code for maintaining an unavailable deque of resources that have been determined to be at least one of not created successfully and not able to be refreshed;
   computer code for maintaining an available deque of resources that have been determined to be available;
   computer code for determining that pool shrinking is necessary;
   computer code for removing unavailable resources that have been determined to be at least one of not created successfully and not able to be refreshed from the unavailable deque of the resource pool; and then
   computer code for removing available resources from the available deque of the resource pool.

12. A computer program product, embedded in a computer readable storage medium, for execution by a server computer for performing maintenance on connection pool deques in an application server, comprising:
   computer code for maintaining an unavailable deque of resources that have been determined to be at least one of not created successfully and not able to be refreshed;
   computer code for maintaining a reserved deaue of resources that have been requested or are in use;
   computer code for traversing the unavailable deque and the reserved deque;
   computer code for performing maintenance on the unavailable deque; and then
   computer code for performing maintenance on the reserved deque;
   wherein said computer code for traversing the unavailable and the reserved deques includes computer code for determining what resources are stored in the unavailable deque and the reserved deque.

13. The computer program product as claimed in claim 12 wherein said computer code for performing maintenance on the unavailable deque includes:
   computer code for scheduling resource creation for each resource in the unavailable deque.

14. The computer program product as claimed in claim 12 wherein said computer code for performing maintenance on the reserved deque includes:
   computer code for determining whether a resource in the reserved deque has been used since the last time maintenance was performed on the reserved deque;
   computer code for moving the resource to the available deque upon the determination that the resource was not used since the last time maintenance was performed.

15. The computer program product of claim 13 wherein the computer code for scheduling resource creation for each resource in the unavailable deque includes:
computer code for scheduling a resource retry task.

16. The computer program product of claim 15 wherein the computer code for scheduling a resource retry task includes:
computer code for generating a resource in the connection pool;
computer code for determining whether the resource was created successfully in the connection pool;
computer code for moving the resource to an available deque and cancelling the resource retry task when successful generation of the resource is confirmed; and
computer code for moving the resource to an unavailable deque for tracking resources that are not created successfully and retrying the step of generating a resource in the connection pool, upon unsuccessful generation of the resource.

17. The computer program product of claim 16 wherein a periodicity of the resource retry task is determined by reading an attribute that is configured by an application or a resource pool object.

18. The computer program product of claim 13 wherein the computer code for scheduling resource creation for each resource in the unavailable deque includes:
computer code for determining that a period of time has expired; and
computer code for generating a resource at the expiration of the period of time.

19. The computer program product of claim 14 further comprising:
computer code for determining that a period of time has expired; and
computer code for performing maintenance on the reserved deque at the expiration of the period of time.

20. The computer program product of claim 19 wherein the period of time is an attribute configured by an application or a resource pool object.

* * * * *

UNITED STATES PATENT AND TRADEMARK OFFICE
CERTIFICATE OF CORRECTION

PATENT NO. : 7,080,126 B2
APPLICATION NO. : 10/719088
DATED : July 18, 2006
INVENTOR(S) : Srivastava et al.

Page 1 of 1

It is certified that error appears in the above-identified patent and that said Letters Patent is hereby corrected as shown below:

Column 14
In Claim 12, line 40 please correct "deaue" to read --deque--

Column 14
In Claim 12, line 52 please correct "degue" to read --deque--

Signed and Sealed this

Twenty-fourth Day of October, 2006

JON W. DUDAS
*Director of the United States Patent and Trademark Office*